US 6,694,089 B2

(12) United States Patent
Shim et al.

(10) Patent No.: US 6,694,089 B2
(45) Date of Patent: *Feb. 17, 2004

(54) OPTICAL DISK RECORDING DEVICE FOR PRODUCING DISKS ADAPTED FOR DIRECT ACCESS REPRODUCTION AND A DIRECT ACCESS REPRODUCING METHOD THEREOF

(75) Inventors: Jae-Seong Shim, Seoul (KR); Hee-Wan Lee, Kyonggi-do (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,015

(22) Filed: Dec. 9, 1998

(65) Prior Publication Data

US 2003/0049018 A1 Mar. 13, 2003

(30) Foreign Application Priority Data

Dec. 31, 1997 (KR) ............................................. 97-80567

(51) Int. Cl.[7] .............................. H04N 5/91; H04N 7/04; H04N 7/06; H04N 7/08; H04N 7/52; H04N 5/781; H04N 5/85; H04N 5/90
(52) U.S. Cl. ............................. 386/70; 386/95; 386/125
(58) Field of Search .......................... 386/4, 45, 69–70, 386/64, 55, 125–126; 345/700, 701

(56) References Cited

U.S. PATENT DOCUMENTS

| 5,734,788 A | * | 3/1998 | Nonomura et al. | ......... 386/126 |
| 5,742,569 A | * | 4/1998 | Yamamoto et al. | ............ 369/32 |
| 5,818,439 A | * | 10/1998 | Nagasaka et al. | ............ 345/327 |
| 5,956,458 A | * | 9/1999 | Sezan et al. | ................... 386/95 |
| 5,974,218 A | * | 10/1999 | Nagasaka et al. | .............. 386/46 |
| 5,974,219 A | * | 10/1999 | Fujita et al. | ................... 386/52 |
| 6,018,609 A | * | 1/2000 | Yamada et al. | ................ 386/41 |
| 6,192,183 B1 | * | 2/2001 | Taniguchi et al. | .......... 345/723 |
| 6,256,419 B1 | * | 7/2001 | Nagasaka et al. | ........... 382/236 |
| 6,275,451 B1 | * | 8/2001 | Park et al. | ..................... 369/32 |

FOREIGN PATENT DOCUMENTS

| EP | 0 598 516 A | | 5/1994 |
| EP | 0 731 469 A | | 9/1996 |
| EP | 0 752 705 | | 1/1997 |
| WO | 94/11995 | * | 5/1994 |

OTHER PUBLICATIONS

M. Kageyama et al.: "A Free Time–Shift DVD Video Recorder", IEEE Transactions on Consumer Electronics, US, IEEE Inc., New York, vol. 43, nr. 3, Aug. 1, 1997 pp. 469–473.

* cited by examiner

*Primary Examiner*—Thai Tran
*Assistant Examiner*—Polin Chieu
(74) *Attorney, Agent, or Firm*—Staas & Halsey LLP

(57) ABSTRACT

An optical disk recording device providing disks adapted for direct access reproduction and a direct access reproducing method thereof. A recording location of a disk at a user-selected direct access unit time or a user-selected time point is stored as a reproduction starting address. Prepared pictures or pictures selected by a user during recording data on the disk are recorded as choice menus on the disk. A direct access table is generated in which reproduction starting addresses are cross-referenced with recording locations of the choice menus. The direct address table is recorded in a specific area of the disk. During reproduction, the direct access table is read and the choice menus are read from the disk according to the recording locations of the choice menus included in the direct access table. A direct access menu picture is generated and displayed. Data at a recording location of the disk corresponding to the reproduction starting address of a user-selected choice menu is reproduced in response to a user's selection.

23 Claims, 8 Drawing Sheets

OPTICAL DISK RECORDING DEVICE FOR PRODUCING DISKS ADAPTED FOR DIRECT ACCESS REPRODUCTION AND A DIRECT ACCESS REPRODUCING METHOD THEREOF

CROSS REFERENCE TO RELATED APPLICATIONS

This application claims the benefit of Korean Application No.1997-80567 which is hereby incorporated by reference.

BACKGROUND OF THE INVENTION

The present invention relates to an optical disk system, and in particular, to a device and method for recording or reproducing information on or from an optical disk.

With an optical disk recording device, information, such as a movie, can be recorded on a recordable optical disk such as a DVD-R (Digital Video Disk Recordable) or a DVD-RAM (Digital Video Disk Random Access Memory). When a user records a movie for continuous reproduction with an optical disk reproducing device, only continuous reproduction is possible, i.e., direct access to a specific part of the movie is not possible. To allow the user to reproduce data in a manner with allows direct access to a specific part of the disk, an optical disk recording device must simultaneously record and edit the information in cooperation with a computer using a storage means such as a hard disk. As can be imagined, such a recording procedure is a great inconvenience and cannot be performed in real time. Currently, it is impossible for a user to easily record information in such a way that he may directly access data on an intended location of the disk during reproduction.

SUMMARY OF THE INVENTION

An object of the present invention is to provide an optical disk recording device which can record data on an optical disk in such a way that a user can reproduce the data while enjoying direct access to a selected location of the disk.

Another object of the present invention is to provide a direct access reproducing method which allows a user to reproduce data while enjoying direct access to a selected location of an optical disk.

Additional objects and advantages of the invention will be set forth in part in the description which follows, and, in part, will be obvious from the description, or may be learned by practice of the invention.

Objects of the invention are achieved in an optical disk recording device for direct access reproduction in which a recording location on a disk, at a user-selected direct access unit time or a user-selected time point, is stored as a reproduction starting address. Prepared pictures or pictures selected by a user, while recording data on the disk, are recorded as choice menus on the disk. A direct access table is created, in which reproduction starting addresses are matched with the recording locations of the choice menus. The direct access table is recorded at a specific area of the disk.

Objects of the present invention are also achieved in a direct access reproducing method comprising reading a direct access table in a direct access reproduction mode, reading choice menus from the disk according to the recording locations of the choice menus included in the direct access table, displaying a direct access menu picture, and reproducing data, at the recording location of the disk, corresponding to the reproduction starting address of a user-selected choice menu.

BRIEF DESCRIPTION OF THE DRAWINGS

The above objects and advantages of the present invention will become more apparent and more readily appreciated from the following description of the preferred embodiments with reference to the accompanying drawings in which.

DETAILED DESCRIPTION OF THE PREFERRED EMBODIMENTS

Figure 1:
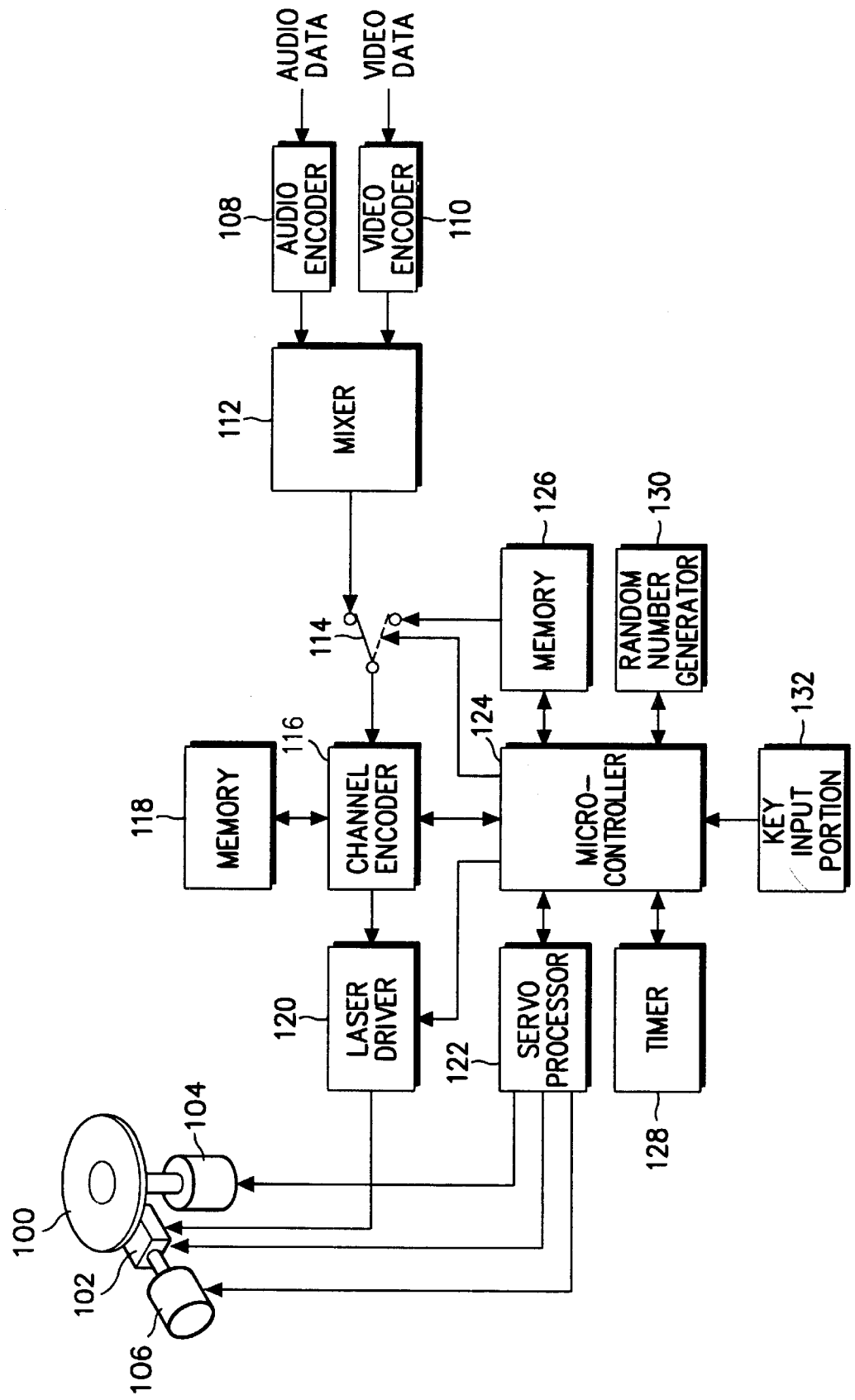
FIG. 1 is a block diagram of an optical disk recording device for producing disks adaptable for direct access reproduction according to a first embodiment of the present invention.

Preferred embodiments of the present invention will be described in detail with reference to the attached drawings. Though certain particular details such as structure or flowchart are disclosed in description of the present invention and corresponding drawings for comprehensive understanding of the subject matter of the present invention, they are merely exemplary. A detailed description of known functions and structures used in the present invention has been omitted if such description is well known to one of ordinary skill in the art and such disclosure obscures the subject matter of the present invention.

Reference will now be made in detail to the present preferred embodiments of the present invention, examples of which are illustrated in the accompanying drawings, wherein like reference numerals refer to like elements throughout.

FIG. 1 is a block diagram of an optical disk recording device for producing disks adapted for direct access reproduction according to a first embodiment of the present invention. The optical disk recording apparatus generally comprises: a general optical disk recording/reproducing apparatus (described hereinafter) with the addition of a switch 114, a memory 126, a timer 128, and a random number generator 130. The optical disk recording device of FIG. 1 is so constituted that when a user is recording a movie, to be reproduced with direct access, in predetermined time periods, for example ten minutes from the moment when the movies plays, different pictures, each corresponding to the beginning of a time period, are created and stored as different choice menus. During playback, data from a corresponding reproduction time period is directly accessed upon when a user selects a specific choice menu.

Figure 8:
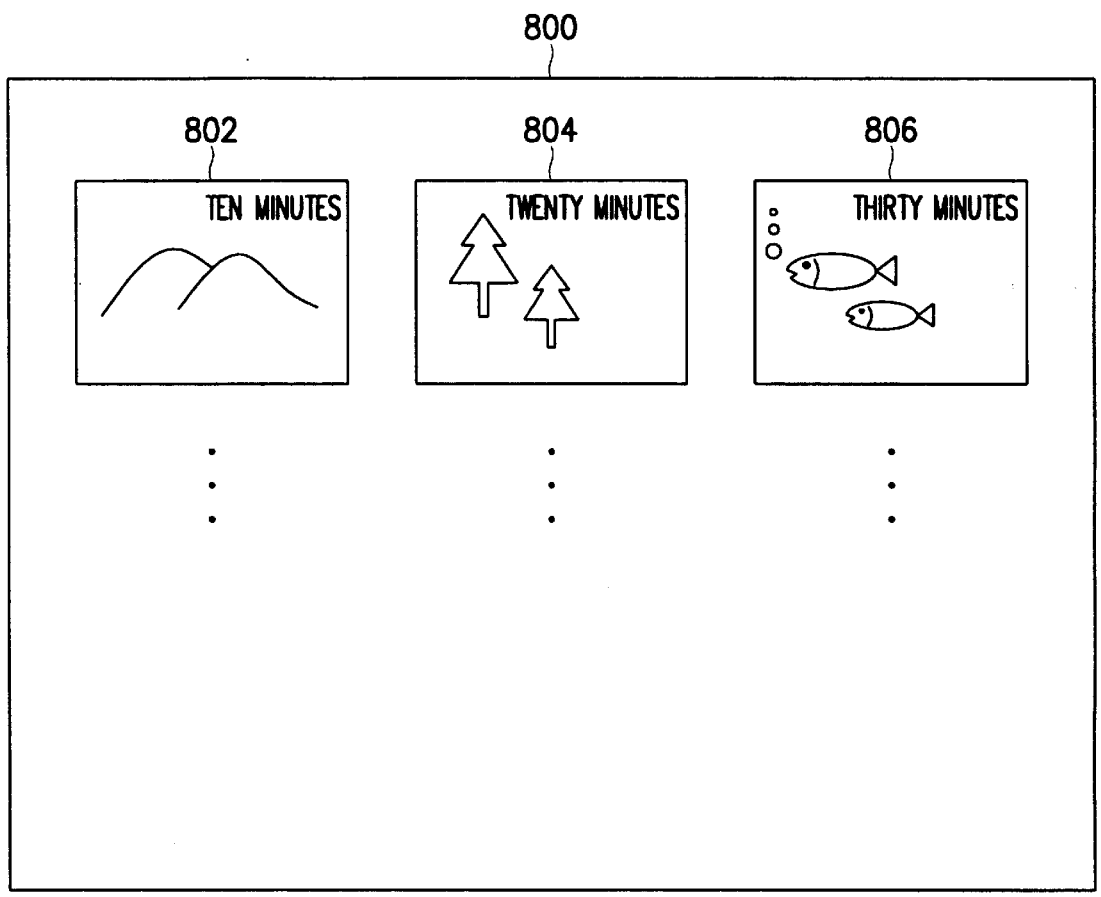
FIG. 8 is a diagram of choice menus for use with direct access reproduction according to the preferred embodiments of the present invention.

FIG. 8 is a diagram of choice menus for direct access reproduction according to the preferred embodiments of the present invention. FIG. 8 only shows one of many possible configurations and screen displays. One of ordinary skill in the art will realize that the exact configuration and screen display will be dictated by the specific implementation of the invention. Choice menus 802, 804 and 806 are displayed in a menu picture 800 so that a recording position can be selected for direct access reproduction. Each choice menu corresponds to one of a plurality of time periods predetermined time set in units, for example ten minutes.

Referring once again to FIG. 1, an optical pickup 102 records data on a disk 100 using a light source driven by a laser driver 120. The light source preferably is a semiconductor laser, such as laser diode. This optical pickup 102 includes a focusing actuator (not shown) and a tracking actuator (not shown). The focusing actuator moves an object lens of the optical pickup 102 along an optical axis direction under control of a servo processor 122, while the tracking actuator moves the object lens of the optical pickup 102 along the radial direction of the disk 100 to search for a track, under control of a servo processor 122. A spindle motor 104 rotates the disk 100 at a constant linear velocity (CLV) under control of the servo processor 122. A sled feed motor 106 transfers the body of the optical pickup 102 under the control of the servo processor 122. The servo processor 122, which controls the focusing and tracking actuators of the optical pickup 102, the spindle motor 104, and the sled fed motor 106, are in turn ultimately controlled by a microcontroller 124, such as a microprocessor.

An audio encoder 108 encodes audio data for placement on the disk 100. A video encoder 110 encodes video data for placement on the disk 100. A mixer 112 mixes the outputs of the audio encoder 108 and the video encoder 110. The switch 114 selects between the outputs of the mixer 112 and the memory 126 and outputs the selected data to a channel encoder 116 under the control of the microcontroller 124. The channel encoder 116 channel-encodes the output of the switch 114 and outputs the channel-encoded data in the form of bit streams, to a laser driver 120 for recording on the disk 100.

Generally, in the channel encoder 116, the output of the switch 114 is encoded with an address on the disk 100, that is, an ID (Identification), and an ID correction parity. The encoded output is then subjected to scrambling, that is, addition of an error detection parity, has an additional data error correcting parity, and is finally 8/16-modulated and outputted. The modulated output, in bit stream format, of the channel encoder 116 is applied to the laser driver 120. The memory 118 functions as a data storage for the channel encoder 116 during processing. The laser driver 120 optically modulates the bit streams received from the channel encoder 116 and applies the optically modulated data to the optical pickup 102 so that the light source of the optical pickup 102 is driven to record the bit streams on the disk 100.

The memory 126 stores video data for a plurality of pictures. The memory 126 outputs video data of a picture corresponding to an address designated by the microcontroller 124 to the switch 114. The timer 128 generates an interrupt signal upon passage of a unit time preset by the microcontroller 124 (for example 10 minutes) and applies the interrupt signal to the microcontroller 124. The random number generator 130 generates random numbers included in addresses of the memory 126 and applies the random numbers to the microcontroller 124. A key input portion 132, such as an IR remote control, keyboard, input pad, or even a mouse, provides a key input of a user to the microcontroller 124.

Figure 2:
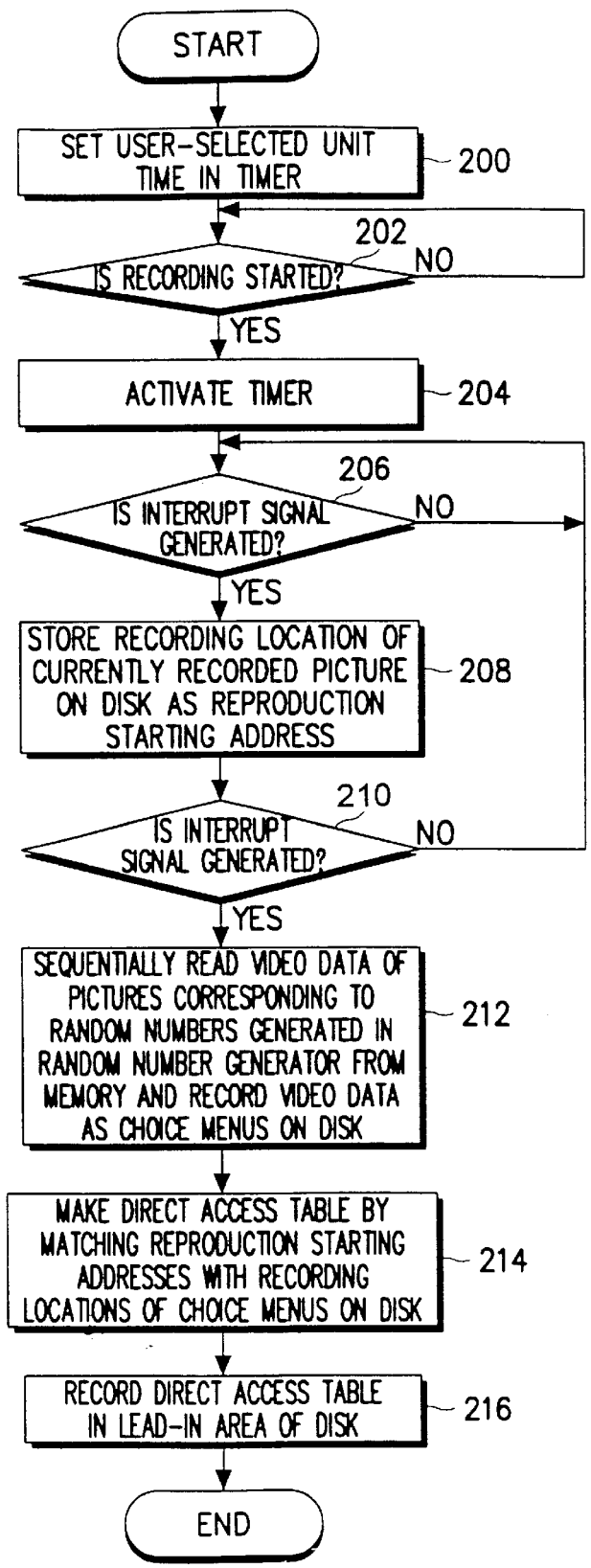
FIG. 2 is a flowchart of the operation of a microcontroller, shown in FIG. 1, according to the first embodiment of the present invention.

FIG. 2 is a flowchart illustrating the operation of the microcontroller 124 according to the first embodiment of the present invention. When a user wants to record data, such as a movie, on the disk 100, using the optical disk recording device of FIG. 1, adapted for direct access during reproduction, he selects a direct access reproduction recording mode using the key input portion 132. The user selects a direct access time interval for using during playback, calculated from a reproduction starting point using the key input portion 132.

Then in step 200, the microcontroller 124 sets the user-selected direct access unit time received from the key input portion 132 in the timer 128. In a loop at step 202, the microcontroller 124 waits for data recording to be initiated. When data starts to be recorded on the disk 100, the operation goes to step 204 and the microcontroller 124 activates the timer 128. Subsequently, in a loop at step 206, the microcontroller 124 waits for an interrupt signal to be generated by the timer 128. The timer 128 generates an interrupt signal upon passage of every direct access unit time from the recording starting point and applies the interrupt signal to the microcontroller 124.

Every time the timer 128 generates an interrupt signal, the operation goes to step 208 and the microcontroller 124 stores the current recording location of the disk 100 as a reproduction starting address, in step 208. Subsequently, in a loop at step 210, the microcontroller 124 checks whether recording is completed. If recording is not completed, the procedure returns to step 206.

Once recording is completed on the disk 100 (through repeated implementation of steps 206 through 210), the operation goes to step 212 and the microcontroller 124 sequentially reads the video data of pictures corresponding to random numbers generated by the random number generator 130 and records the video data as choice menus on the disk 100. Basically, the switch 114 selects the output of the mixer 112 and applies the selected data to the channel encoder 116 while data is being recorded, and subsequently provides the output of the memory 126 to the channel encoder 116 under the control of the microcontroller 124 when recording is completed. The pictures stored in the memory 126 by a manufacturer of the optical disk recording device shown in FIG. 1 are provided as choice menus during a subsequent direct access reproduction, see FIG. 8.

Following recording of the video data of the choice menus on the disk 100, the operation goes to step 214 and the microcontroller 124 generates a direct access table in which the reproduction starting addresses stored in step 208 are matched with the recording locations of the choice menus on the disk 100. Next, in step 216, the microcontroller 124 sends the direct access table to the channel encoder 116 to be recorded at a specific area on the disk 100. The specific area may be, for example, a lead-in area of the disk 100. An exemplary direct access table is shown in Table 1.

TABLE 1

| Index | Recording Location of Choice Menu on Disk | Reproduction Start Address Designated by Choice Menu |
|---|---|---|
| INDEX 1 | MENU ADDR. #1 | PLAY ADDR. #1 |
| INDEX 2 | MENU ADDR. #2 | PLAY ADDR. #1 |
| INDEX 3 | MENU ADDR. #3 | PLAY ADDR. #1 |
| . | . | . |
| . | . | . |
| . | . | . |
| INDEX n | MENU ADDR. #4 | PLAY ADDR. #1 |

Table 1 also contains a reproduction starting address representative of the recording location of data recorded at a designated time corresponds to the recording location of a choice menu. Using the direct access table a user can reproduce data, with direct access to an intended recording location, by selecting a choice menu, as is described hereinafter.

Although the first embodiment of the present invention has been described with respect to a specific configuration, it will be recognized that the first embodiment is not limited to the specific configuration. For example, while the pictures for the choice menus have been disclosed as being randomly selected, they could be preselected by the user or interactively selected by the user during recording.

Figure 3:
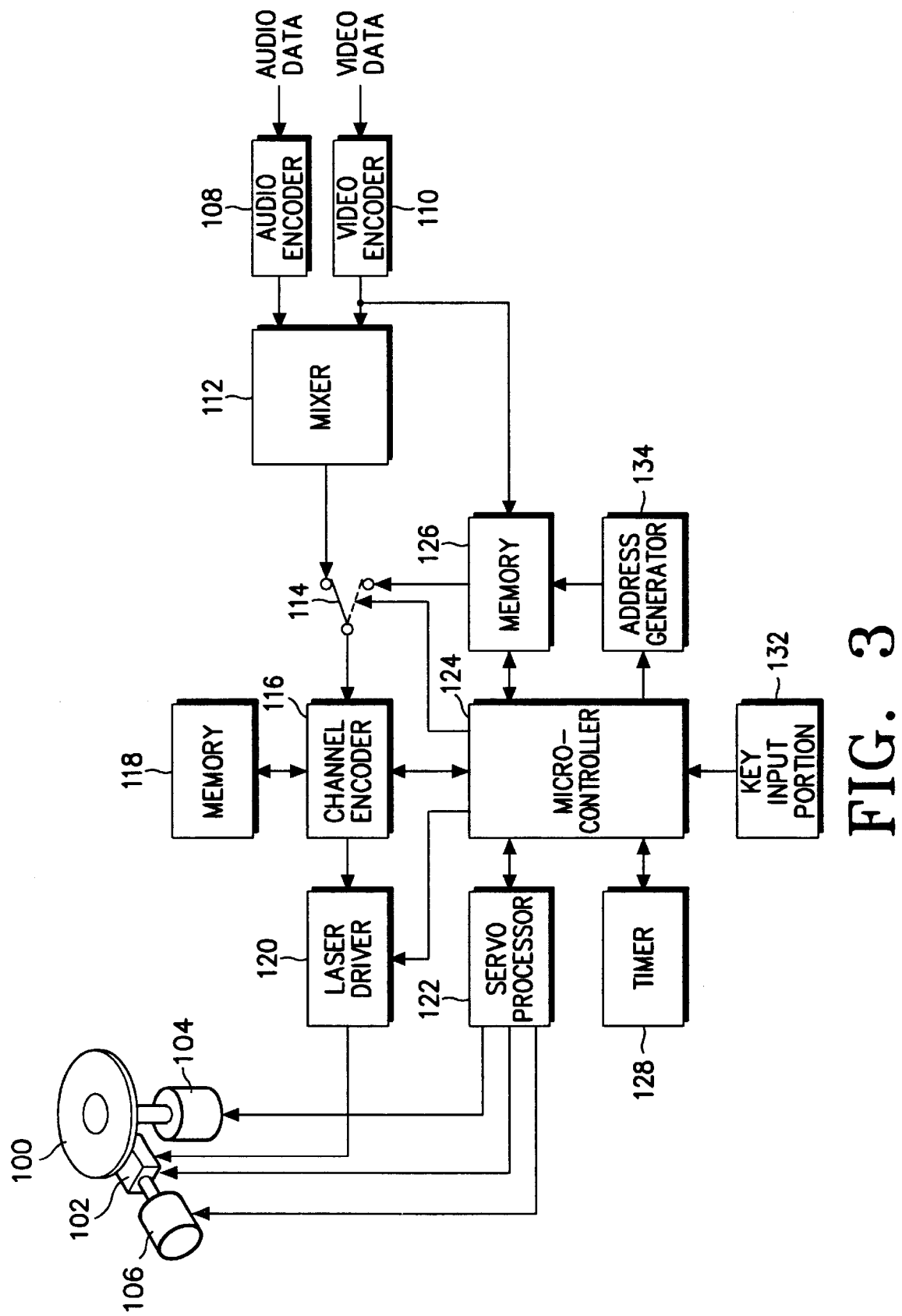
FIG. 3 is a block diagram of an optical disk recording device for producing disks adapted for direct access reproduction according to a second embodiment of the present invention.

FIG. 3 is a block diagram of an optical disk recording device for producing a disk adapted for direct access reproduction according to a second embodiment of the present invention. Here, the random number generator 130 of FIG. 1 is omitted in favor of an address generator 134. Additionally, the output of the video encoder 110 is also applied to the memory 126. In the optical disk recording device shown in FIG. 3, pictures for choice menus are not prestored in the memory 126, as described in FIG. 1. Rather, the video data from the movie, input and recorded at a unit time period, selected by a user after a movie to be recorded starts, is stored in the memory 126 and used as a choice menu. This offers the advantage in that the picture for direct access reproduction in a unit time period is copied from the movie as a choice menu. Thus, the user can select a direct access reproduction location with feeling of being connected to the movie. The address generator 134 generates a storage address in the memory 126 under the control of the microcontroller 124.

Figure 4:
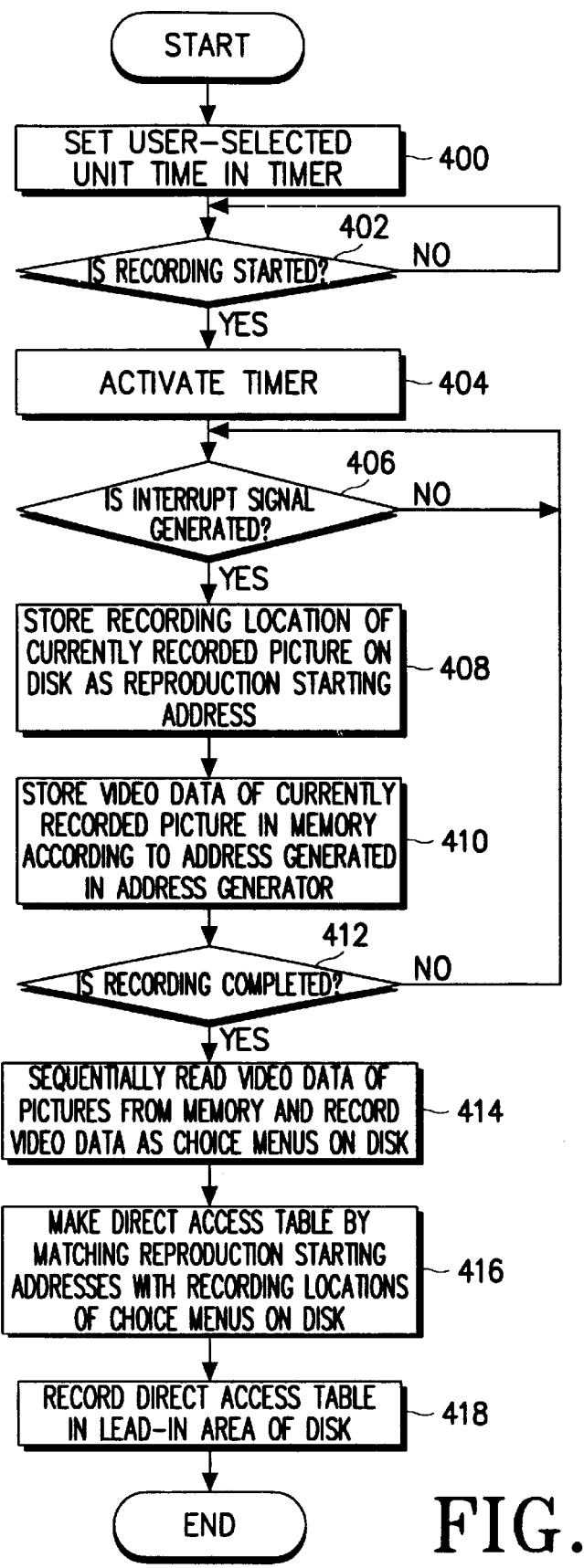
FIG. 4 is a flowchart of the operation of a microcontroller, shown in FIG. 3, according to the second embodiment of the present invention.

FIG. 4 is a flowchart showing the operation of the microcontroller 124 shown in FIG. 3 according to the second embodiment of the present invention. When a user wants to record data, such as a movie, on the disk 100 using the optical disk recording device shown in FIG. 3, the user selects a direct access reproduction recording mode using the key input portion 132. For playback of the data, the user selects a direct access time interval calculated from a reproduction starting point as a direct access unit time using the key input portion 132.

Then, in step 400, the microcontroller 124 sets the user-selected direct access unit time received from the key input portion 132 in the timer 128. Subsequently, in a loop at step 402, the microcontroller 124 waits for data recording to be initiated. When data recording starts in step 402, the operation goes to step 404 and the microcontroller 124 activates the timer 128. Then, in a loop at step 406, the microcontroller 124 waits for an interrupt signal to generate in the timer 128 in a loop at step 406. The timer 128 generates an interrupt signal upon passage of every direct access unit time from the recording starting point and applies the interrupt signal to the microcontroller 124.

Every time the timer 128 generates an interrupt signal, the microcontroller 124 stores the current recording location of the disk 100 as a reproduction starting address, in step 408. Thereafter, the microcontroller 124 stores the video data of the currently recorded picture in the memory 126 by designating an address by the address generator 134. At this time, the video data of the currently recorded picture is stored in the memory 126 by the video encoder 110.

Then, in a loop at step 412, the microcontroller 124 checks whether recording is completed. When recording is not completed, the procedure returns to step 406. Once recording is completed on the disk 100 (through repeated implementation steps 406 through 412), the operation goes to step 414 and the microcontroller 124 sequentially reads the video data of pictures from the memory 126 and records the video data as choice menus on the disk 100. Basically, the switch 114 selects the output of the mixer 112 and applies the selected data to the channel encoder 116 while data is being recorded, and subsequently provides the output of the memory 126 to the channel encoder 116 under the control of the microcontroller 124 when recording is completed. Then, in step 416, the microcontroller 124 generates a direct access table, for example, as shown in Table 1, in which the reproduction starting addresses stored in step 408 corresponds with the recording locations of the choice menus on the disk 100. In step 418, the microcontroller 124 applies the direct access table to the channel encoder 116 to be recorded at a specific area on the disk 100.

Although the second embodiment of the present invention has been described with respect to a specific configuration, it will be recognized that the second embodiment is not limited to the specific configuration. For example some pre-defined image processing could be applied to the recorded picture prior to storage on the optical disk 100.

Figure 5:
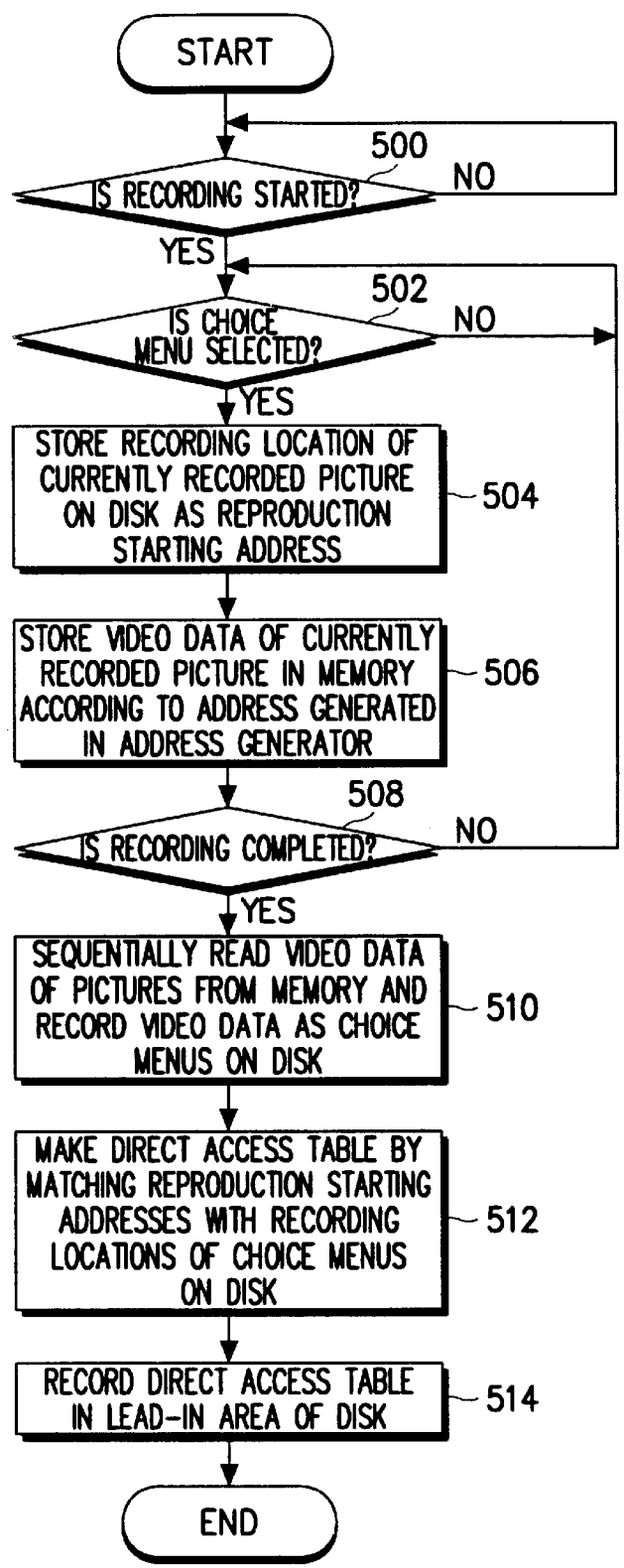
FIG. 5 is a flowchart of the operation of the microcontroller, shown in FIG. 3, according to a third embodiment of the present invention.

FIG. 5 is a flowchart illustrating the operation of the microcontroller 124 according to a third embodiment of the present invention. Here, a user manually and interactively sets a direct access reproduction time point at which the video data of the movie is input and stored with at the time point as a choice menu in the memory 126. This is to be compared to the flowcharts shown of FIGS. 2 and 4 in which a direct access time interval is predetermined.

When a user wants to record data like a movie on the disk 100 using the optical disk recording device, shown in FIG. 3, he selects a direct access reproduction recording mode using the key input portion 132. Here, a direct access time interval is not selected, instead, the user selects the picture at an intended time point during recording, which obviates the need of the timer 128 shown in FIG. 3.

The microcontroller 124 waits, in a loop at step 500 for data recording to be initiated (in response to the selection of the recording mode for direct access reproduction). When recording starts on the disk 100 in step 500, the operation goes to step 502 and the microcontroller 124 waits for the user to select a picture (menu choice) in step 502. When the user selects a picture at an intended time point in step 502, the operation goes to step 504 and the microcontroller 124 stores a recording location at the time point as a reproduction starting address. In step 506, the microcontroller 124 stores the video data of the currently recorded picture in the memory 126 by designating an address using the address generator 134. The video data of the currently recorded picture is stored in the memory 126 from the video encoder 110. Then, in step 508, the microcontroller 124 checks whether recording is completed. If recording is not over, the procedure returns to step 502.

When recording is completed on the disk in step 508 (through repetition of steps 502 through 508), operation goes to step 510 and the microcontroller 124 sequentially reads the video data of pictures from the memory 126 and records the video data as choice menus on the disk. Basically, the switch 114 selects the output of the mixer 112 and applies the selected data to the channel encoder 116 while data is being recorded, and subsequently applies the output of the memory 126 to the channel encoder 116 under the control of the microcontroller 124 when recording is completed. In step 512, the microcontroller 124 generates a direct access table, for example, as shown in Table 1, in which the reproduction stating addresses stored in step 506 matches with the recording locations of choice menus on the disk 100. Next, in step 514, the microcontroller 124 sends the direct access table to the channel encoder 116 to be recorded at a specific area on the disk 100.

Although the third embodiment of the present invention has been described with respect to a specific configuration, it will be recognized that the third embodiment is not limited to the specific configuration. For example, a combination of the second and third embodiments is envisioned in which controller is responsible to both the times and the user in setting locations in the movie for choice menus.

Figure 6:
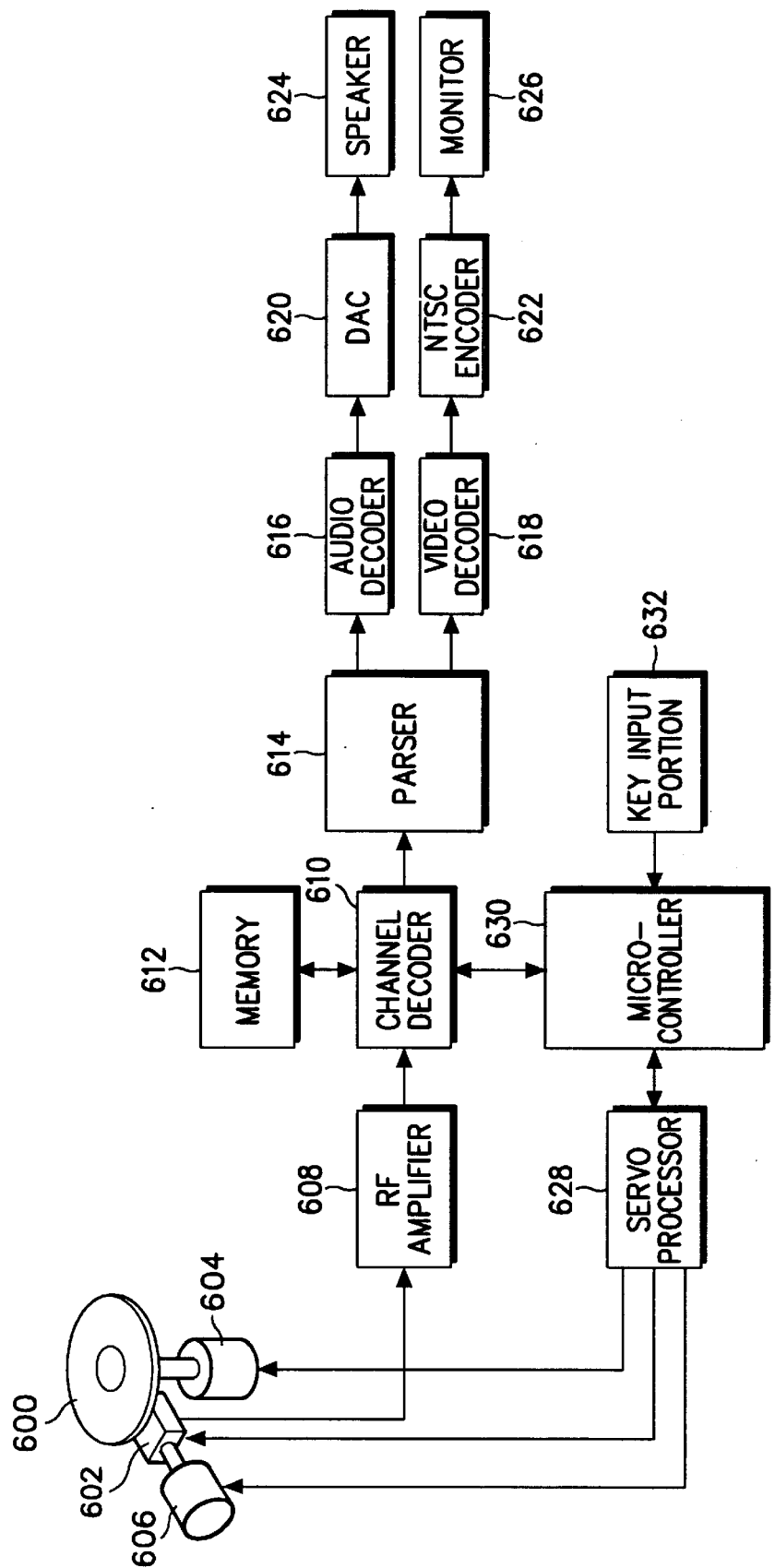
FIG. 6 is a block diagram of an optical disk reproducing device according to a fourth embodiment of the present invention.

FIG. 6 is a block diagram of an optical disk reproducing device for reproducing the optical disks masted by any of the foregoing optical disk recording devices, forming a fourth embodiment of the present invention. In FIG. 6, a spindle motor 604, a sled feed motor 606, and a servo processor 628 correspond to the spindle motor 104, the sled feed motor 106, and the servo processor 122 shown in FIG. 1, respectively. A key input portion 632 serves a similar function (discussed hereinafter) but does not necessarily have a similar configuration to the key input portion 132.

An optical pickup 602 optically picks up data recorded on a disk 600, generates an electrically converted RF (Radio Frequency) signal, and outputs the RF signal to an RF amplifier 608. The RF amplifier 608 amplifies the RF signal received from the optical pickup 602, corrects the wave of the amplified RF signal, and outputs bit streams for recording to a channel decoder 610. The channel decoder 610, under control of a microcontroller 630, demodulates the bit streams received from the RF amplifier 608 and corrects errors in the bit streams to recover data, and outputs the recovered data to a parser 614. A memory 612 serves as a data storage for the channel decoder 610.

The parser 614 applies the recovered audio and video data to the audio and video decoders 616 and 618, respectively. The audio decoder 616 decodes the audio data and outputs the decoded audio data to a digital-to-analog converter (DAC) 620. The DAC 620 converts the audio data to an analog signal and applies the analog signal to a speaker 624. The video decoder 618 decodes the video data and outputs the decoded video data to an NTSC (National Television System Committee) encoder 622 for display on a monitor 626. Of course, the NTSC encoder 622 corresponds to the standard for which a monitor 626 is used. A PAL encoder or any other appropriate encoder, such as an HDTV encoder, can be used. Thus, audio and video data reproduced from the disk 600 is output via the speaker 624 and the monitor 626, respectively.

Figure 7:
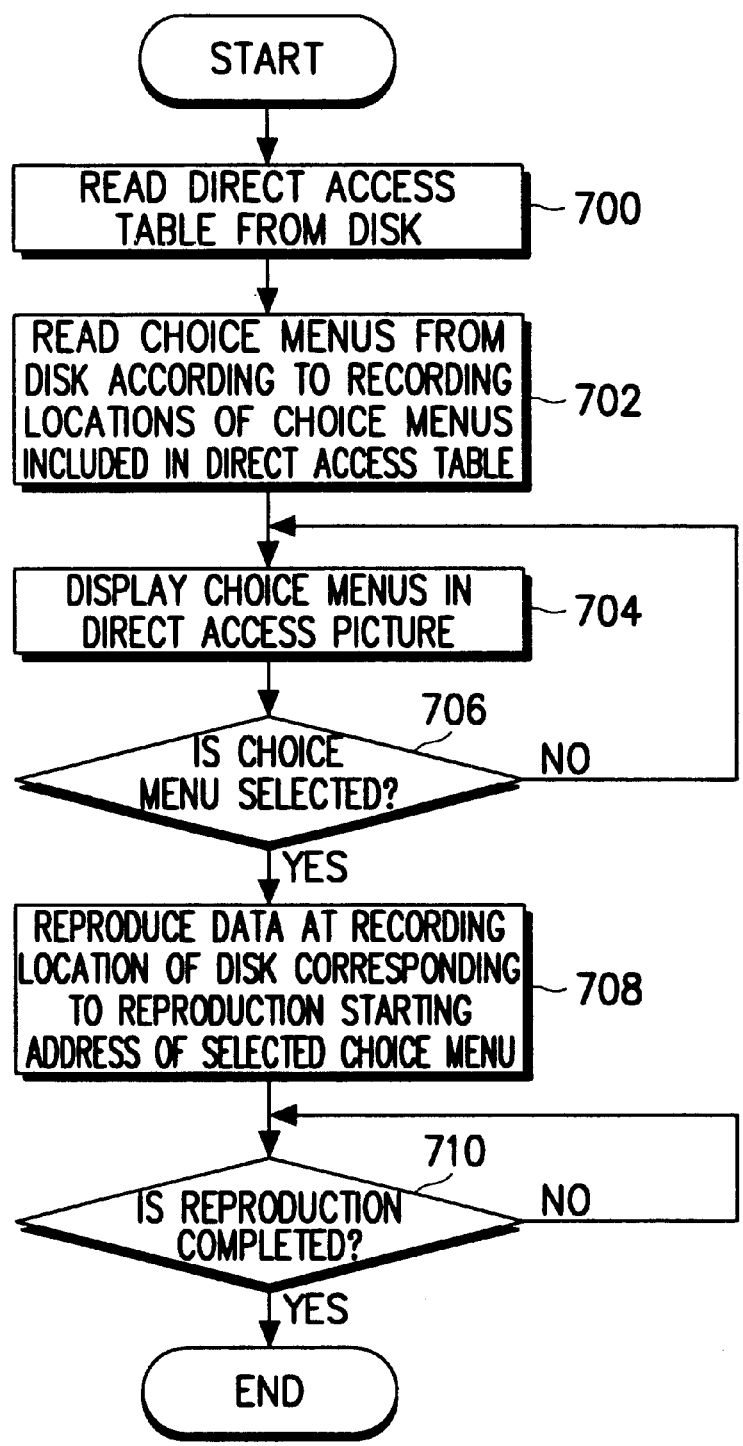
FIG. 7 is a flowchart of the operation of a microcontroller, shown in FIG. 6, according to the fourth embodiment of the present invention.

FIG. 7 is a flowchart illustrating the operation of the microcontroller 630 shown in FIG. 6 according to the fourth embodiment of the present invention. When a user selects a direct access reproduction mode of an optical disk 600 using the key input portion 632 (such as an IR remote control), the operation starts in step 700 and microcontroller 630 reads the direct access table, for example, as shown in Table 1 from the disk 600. In step 702, the microcontroller 630 reads choice menus from the disk 200 according to the recording locations of the choice menus included in the direct access table. In a loop comprising steps 704 and 706, the microcontroller 639 waits for the user to select a choice menu through the key input portion 632, displaying the choice menus in a direct access menu picture. Here, the time corresponding to the recording location of each choice menu is displayed together with the choice menu, as shown in FIG. 8.

When, in step 706, the user selects one of the choice menus in the direct access menu picture, the operation goes to step 708 and microcontroller 630 reproduces data at the recording location of the disk 100 corresponding to the reproduction starting address of the selected choice menu. The operation then waits in step 710 until the data is completely reproduced, and the operation is completed in step 710.

As described above, data is recorded on a disk in such a way that data at an intended location can be directly accessed and reproduced. From such a disk, a user can reproduce data with direct access to a specific intended location of the disk.

Although the fourth embodiment of the present invention has been described with respect to a specific configuration, it will be recognized that the fourth embodiment is not limited to the specific configuration. Once of ordinary skill in the art will recognize that there any many possibilities for a user interface, other than those shown in FIG. 8. Any such interface may be used as long as the user is presented with the stored choice menus.

Although a few preferred embodiments of the present invention have been shown and described, it would be appreciated by those skilled in the art that changes may be made in these embodiments without departing from the principles and spirit of the invention, the scope of which is defined in the claims and their equivalents. While the present invention has been described in detail with reference to the specific embodiments, they are merely exemplary applications. Thus, it is to be clearly understood that many variations can be made by anyone skilled in the art within the scope and spirit of the present invention. For example, although the direct access table is recorded in the lead-in area of a disk in the embodiments of the present invention, the location of the direct access table is not confined to the lead-in area. In addition, the direct access table may be recorded by a seller who records necessary data on a disk, not by a user. Further, the present invention has been described with particular emphasis on audio/visual data representing movies. However, one of ordinary skill in the art will recognize that various embodiments of the present invention are also applicable to other types of data to be sequentially reproduced, such as: audio, slide shows, presentations, number sequences, and animation.

What is claimed is:

1. An optical disk recording device comprising:
   an audio encoder encoding audio data to be recorded on an optical disk;
   a video encoder encoding video data to be recorded on the optical disk;
   a mixer mixing the outputs of the audio and video encoders and outputting data to be recorded on the optical disk;
   a memory prestoring a plurality of pictures;

a switch selectively selecting one of the outputs of the mixer and the memory;

a channel encoder channel-encoding the output of the switch and outputting bit streams;

a laser driver driving a light source of an optical pickup according to the bit streams received from the channel encoder, and recording the bit streams on the optical disk;

a random number generator generating random numbers;

a timer generating an interrupt signal upon passage of a preset time unit; and a microcontroller that:
   sets a direct access unit time in the timer;
   activates the timer when data starts to be recorded on the disk;
   stores a current recording location of the disk as a reproduction starting address upon generation of the interrupt signal;
   sequentially reads one of the plurality of pictures based on a random number from the random number generator;
   records the picture as a choice menu on the optical disk after the data has been completely recorded on the disk;
   generates a direct access table in which reproduction starting addresses are cross-referenced with the recording locations of the choice menus on the disk; and
   records the direct access table at a specific area on the disk.

2. The optical disk recording device according to claim 1, wherein the specific area is a lead-in area on the optical disk.

3. An optical disk recording device comprising:

an audio encoder encoding audio data to be recorded on an optical disk;

a video encoder encoding video data to be recorded on the optical disk;

a mixer mixing the outputs of the audio and video encoders and outputting data to be recorded on the optical disk;

a memory storing pictures from the video data stored directly from the video encoder without alteration;

a switch selecting one of the outputs of the mixer and the memory;

a channel encoder channel-encoding the output of the switch and outputting bit streams;

a laser driver driving a light source of an optical pickup according to the bit streams received from the channel encoder, and recording the bit streams on the optical disk;

an address generator generating a storage address in the memory;

a timer generating an interrupt signal upon passage of a preset unit time; and a microcontroller:
   setting a user-selected direct access unit time in the timer;
   activating the timer when data starts to be recorded on the disk;
   storing a current recording location of the disk as a reproduction starting address and the current picture in the memory according to an address designated by the address generator upon generation of the interrupt signal;
   sequentially reading the pictures from the memory;
   recording the pictures as choice menus on the optical disk when data is completely recorded on the disk;
   generating a direct access table in which reproduction starting addresses are cross-referenced with the recording locations of the choice menus on the disk; and
   recording the direct access table at a specific area on the optical disk.

4. The optical disk recording device according to claim 3, wherein the specific area is a lead-in area on the disk.

5. An optical disk recording device comprising:

an audio encoder encoding audio data to be recorded on an optical disk;

a video encoder encoding video data to be recorded on the optical disk;

a mixer mixing the outputs of the audio and video encoders and outputting data to be recorded on the optical disk;

a memory storing a picture received and stored directly from the video encoder without alteration;

a switch selecting one of the outputs of the mixer and the memory;

a channel encoder channel-encoding the output of the switch and outputting bit streams;

a laser driver driving a light source of an optical pickup according to the bit streams received from the channel encoder and recording the bit streams on the optical disk;

an address generator generating a storage address in the memory; and a microcontroller:
   storing a current recording location of the disk, as a reproduction starting address, and the current picture in the memory according to an address designated by the address generator upon user selection of a choice menu;
   sequentially reading the pictures from the memory;
   recording the video data as choice menus on the optical disk after the data has been completely recorded on the disk;
   making a direct access table in which reproduction starting addresses match with the recording locations of the choice menus on the disk; and
   recording the direct access table at a specific area on the optical disk.

6. The optical disk recording device according to claim 5, wherein the specific area is a lead-in area on the disk.

7. A method of reproducing data from a disk, comprising:

reading a direct access table from the disk;

reading choice menus from the disk according to random recording locations of the choice menus included in the direct access table;

displaying the choice menus according to pictures from video data, the choice menus being stored directly from the video encoder without alteration in only one area of the disk; and reproducing data from the recording location of the disk corresponding to the reproduction starting address of a choice menu selected by a user from the displayed choice menus.

8. The method according to claim 7, wherein each choice menu and a time corresponding to the recording location of the choice menu are displayed together in the displaying.

9. A recording device comprising:

a data source supplying sequential data to be recorded on a disk;

an image source supplying images, each image associated with a location in the sequential data;

a controller that records the sequential data on the disk along with the images and a table relating each recorded image to an associated location in the sequential data, and the table relating, according to random numbers, each said recorded image to the associated location in the sequential data to select one of a plurality of pre-stored images from the image source for associating with each location; and a random number generator that outputs random numbers to the controller.

10. The recording device according to claim 9, wherein the image source is a memory containing the plurality of pre-stored picture images.

11. The recording device according to claim 9, further comprising a selecting mechanism selecting the locations in the sequential data to which an image is to be associated.

12. The recording device according to claim 11, wherein the selecting mechanism is a timer which repeatedly issues a signal to the controller upon expiration of a predetermined time period during recording of the sequential data.

13. The recording device according to claim 11, wherein the selecting mechanism is an input mechanism, responsive to a user, which, when activated by the user during recording of the sequential data, issues a signal to the controller.

14. The recording device according to claim 9, wherein the image source is a memory storing part of the sequential data and wherein the image provided for each location in the sequential data is a copy of the sequential data at that location.

15. The recording device according to claim 14, further comprising a selecting mechanism for selecting the locations in the sequential data to which an image is to be associated.

16. The recording device according to claim 15, wherein the selecting mechanism is a timer which repeatedly issues a signal to the controller upon expiration of a predetermined time period during recording of the sequential data.

17. The recording device according to claim 15, wherein the selecting mechanism is an input mechanism, responsive to a user, which, when activated by the user during recording of the sequential data, issues a signal to the controller.

18. The recording device according to claim 9, wherein the sequential data is audio/video data.

19. The recording device according to claim 9, wherein the disk is an optical disk.

20. The recording device according to claim 9, further comprising:

a switch connected to the data source and the image source, the switch, under the control of the controller, selects the output of the data source or the image source to record on the disk.

21. The recording device according to claim 20, wherein the controller in a first stage causes the switch to select the output of the data source to record the sequential data on the disk and in a second stage causes the switch to select the output of the image source to record the images to be associated with a location in the sequential data onto the disk.

22. The recording device according to claim 20, wherein during the first stage the controller:

records an address, in the image source, for an image to be associated with a location in the sequential data during recording of the sequential data when a location to have an associated image is being recorded; and during the second stage sequentially outputs the images from the image source using the addresses recorded in the first stage, generates a table cross-referencing the images to the locations in the sequential data and records the table on the disk.

23. A playback device for playing back sequential data on a disk comprising:

an input device under a users control;

an output section that reads and plays back the sequential data on the disk; and a controller that:

reads a table cross-relating random locations in the sequential data to menu items on the disk; and displays the menu items according to pictures from video data, the menu items being stored directly from the video encoder without alteration in only one area of the disk;

responsive to the input device, causes the output section to play back the sequential data from a location in the sequential data related to a menu item selected by the input device.

* * * * *

UNITED STATES PATENT AND TRADEMARK OFFICE
CERTIFICATE OF CORRECTION

PATENT NO. : 6,694,089 B2 Page 1 of 1
DATED : February 17, 2004
INVENTOR(S) : Jae-Seong Shim et al.

It is certified that error appears in the above-identified patent and that said Letters Patent is hereby corrected as shown below:

<u>Column 11,</u>
Lines 1-15, please replace as follows,
-- A recording device comprising: a data source supplying sequential data to be recorded on a disk; an image source supplying images, each image associated with a location in the sequential data; a controller that records the sequential data on the disk along with the images and a table relating,
according to random numbers, each recorded image to an associated location in the sequential data to select one of a plurality of pre-stored images from the image source for associating with each location; and
　　a random number generator that outputs random numbers to the controller. --

Signed and Sealed this

First Day of June, 2004

JON W. DUDAS
*Acting Director of the United States Patent and Trademark Office*